UNITED STATES PATENT OFFICE.

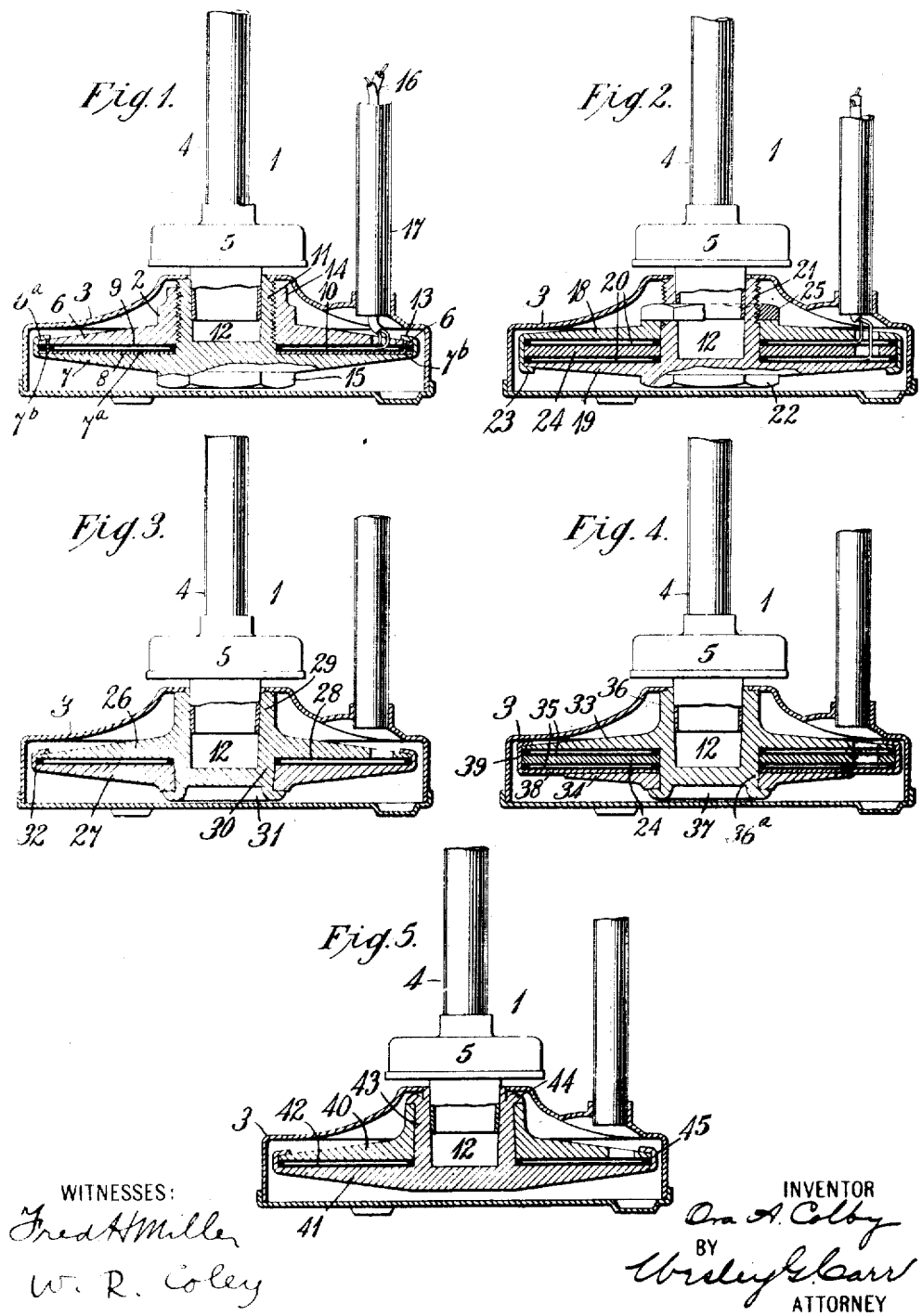

ORA A. COLBY, OF WILKINSBURG, PENNSYLVANIA, ASSIGNOR TO WESTINGHOUSE ELECTRIC AND MANUFACTURING COMPANY, A CORPORATION OF PENNSYLVANIA.

PERCOLATOR-HEATER.

1,268,928.   Specification of Letters Patent.   Patented June 11, 1918.

Application filed April 2, 1913. Serial No. 758,316.

*To all whom it may concern:*

Be it known that I, ORA A. COLBY, a citizen of the United States, and a resident of Wilkinsburg, in the county of Allegheny and State of Pennsylvania, have invented a new and useful Improvement in Percolator-Heaters, of which the following is a specification.

My invention relates to electrically-heated liquid-containing vessels of the percolator type and it has special reference to heater members for use in percolator elements.

One object of my invention is to provide a percolator heater member of inexpensive construction, embodying means for producing pressure on the heater proper and thereby improve the thermal contact with the adjacent parts of good heat-conducting material.

Another object of my invention is to provide a strong, compact and self-alining heater member of an improved form adapted for localizing the heat.

According to my invention, I provide a heater member having a plurality of parts which are mechanically associated in such a manner as to adapt them for exerting pressure on the heater. The several parts, when assembled, form a substantially double frusto-conical heater member, the larger diameter faces being adjacently disposed, and an electric heater element being located intermediate them. A central well contains the body of liquid to be heated, and it is evident that the construction of the heater member lends itself very favorably to a localization around the central well of the greater portion of the emitted heat. The self-alining property of the heater member is obtained by the interengagement of the several component parts and by means of a clamping rim integral with one of the parts and disposed to fit tightly around the other parts.

In the accompanying drawing, Figure 1 is a sectional view of a percolator element embodying my invention; Figs. 3 and 5 are similar section views of modifications thereof; and Figs. 2 and 4 are similar sectional views showing the embodiment of a plurality of electric heaters in connection with my invention.

Referring to Fig. 1 of the drawing, a percolator element 1 comprises a heater member 2 of good heat-conducting material, a heat-insulated incasing member 3 therefor, a fountain tube 4 extending into the heater member 2, and an inlet valve 5 associated with said tube.

The incasing member 3, fountain-tube 4 and valve 5 are old and well known in the art and, consequently, need not be described. It is understood, however, that said parts, or suitable substitutes, are necessary to the completeness of the percolator. The heater member 2 comprises upper and lower substantially frusto-conical members 6 and 7, respectively, of good heat-conducting material, the large-diameter faces 8 and 9 being adjacently disposed; a heater element 10 disposed intermediate said members, and a washer 7ª disposed intermediate the heater element 10 and the lower member 7. The lower member 7 is provided with a centrally-disposed, upwardly-projecting, and exteriorly-threaded hub 11 having a central well 12 into which the fountain tube 4 fits, and is also provided with an upwardly and inwardly hooked rim 13. The upper member 6 fits around the threaded hub 11 and within the rim 13, and has a plurality of oppositely-disposed notches 6ª in the circumference. Both members 6 and 7 have concentrically disposed hexagonally-shaped projections 14 and 15, respectively, which are adapted for use as nuts. The washer 7ª is disposed around the hub 11 and is provided with a plurality of upwardly-extending ears or lugs 7ᵇ cut from its circumference for severally engaging the notches 6ª in the upper member 6, thereby causing the heater 10 and the said upper member to act as one mechanical unit, for a purpose hereinafter described. Leads 16 to said heater may be brought in through a waterproof tube 17, or in any other suitable manner.

It is understood that any suitable type of heater may be employed, as the specific structure thereof is not material to my present invention.

The method of assembling the heater member hereinbefore described is as follows:

The heater element 10 is disposed on the washer 7ª and the latter is assembled with the upper member 6 in such a manner that the ears 7ᵇ rigidly engage the slots 6ª, as hereinbefore described. The combined mechanical unit is then screwed down on the hub 11 of the lower member 7 to give any desired pressure on the heater element 10, the two nuts 14 and 15 being employed to advantage in the process. The purpose of employing the washer 7ª is to prevent rubbing between either member 6 or member 7 and the heater element 10, which might be damaged by said rubbing. The rim 13 is finally spun over to hold the edges in proper position.

In Fig. 2, the heater member 2 comprises upper and lower oppositely-disposed substantially frusto-conical members 18 and 19, respectively, of good heat-conducting material and a plurality of heater elements 20 disposed intermediate them. The lower member 19 is provided with a centrally disposed, upwardly-projecting and exteriorly-threaded hub 21 having a central well 12 into which the fountain tube 4 fits, and is also provided with a downwardly-disposed, hexagonally-shaped projection 22. The upper member 18 fits around the hub 21 and has a downwardly and inwardly hooked rim 23 for engaging the lower member 19. Disposed intermediate said upper and lower members are a plurality of the heater elements 20, and a disk 24 of good heat-conducting material is disposed between said heater elements. A nut 25 screws down on the hub 21 of the upper member 18 for holding said heater elements under pressure.

The method of assembling the heater element just described is as follows: One heater element 20 is disposed around the hub 21 of the lower member 19, then the disk 24 and a second heater element 20. The upper member 18 is next fitted over the hub and the nut 25 is screwed down to give any desired pressure on said heater elements, the hexagonal projection 22 being also employed to advantage in the process. The rim 23 is spun over to hold the edges in position.

In Fig. 3, the heater member 2 comprises upper and lower substantially frusto-conical members 26 and 27, respectively, of good heat-conducting material and a heater element 28 disposed intermediate them. The upper member 26 is provided with a centrally disposed, upwardly-projecting hub 29 having a central well 12 into which the fountain tube 4 fits, and is also provided with a downwardly disposed cylindrical projection 30 having an outwardly disposed circular flange 31. The lower member 27 fits around said cylindrical projection and engages said flange, and is provided with an upwardly and inwardly hooked rim 32 for engaging the upper member 26. The heater element 28 is disposed around the projection 30 and intermediate said upper and lower members.

The method of assembling the heater element just described is as follows: The heater element 28 and lower member 27 are disposed around the projection 30 on the upper member 26 and temporarily clamped together to give any desired pressure on said heater element. The flange 31 is then turned over for maintaining said pressure, and the rim 32 is spun over to hold the edges in position.

In Fig. 4, the heater member 2 comprises upper and lower substantially frusto-conical members 33 and 34, respectively, of good heat conducting material and a plurality of heater elements 35 disposed intermediate them. The upper member 33 is provided with a centrally-disposed, upwardly-projecting hub 36 having a central well 12 into which the fountain tube 4 fits, and is also provided with a downwardly-disposed cylindrical projection 36ª having an outwardly disposed circular flange 37. The lower member 34, of relatively small diameter, fits around the cylindrical projection 36 and engages the flange 37. A thin disk 38 of good heat-conducting material, is disposed adjacent to the lower member 34 and has an upwardly and inwardly hooked rim 39 for engaging the upper member 33. Disposed intermediate said upper member and said disk are a plurality of heater elements 35, and a second disk 24 of good heat-conducting material is disposed intermediate said heater elements.

The method of assembling the heater element just described is as follows: One of the heater elements 35, the disk 24, a second heater element 35, the thin disk 38 and the lower member 34 are disposed in that order on the cylindrical projection 36 and temporarily clamped together to give any desired pressure on the heater elements. The flange 37 is then turned over for maintaining said pressure and the rim 39 is spun over to hold the edges in position.

In Fig. 5, the heater member 2 comprises upper and lower substantially frusto-conical members 40 and 41, respectively, of good heat-conducting material and a heater element 42 disposed intermediate them. The lower member 41 is provided with a centrally disposed, upwardly-projecting hub 43 having a central well 12 into which the fountain tube 4 fits, and is also provided with an outwardly-disposed flange 44 and an upwardly and inwardly hooked rim 45. The upper member 40 fits around said hub and engages said flange and said rim. The heater element 42 is disposed around the hub 43 and intermediate said upper and lower members.

The method of assembling the heater member just described is as follows: The heater element 42 and the upper member 40 are disposed on the hub 43 of the lower member 41 and temporarily clamped together to give any desired pressure on the heater element.

The flange 44 is then turned over for maintaining said pressure and the rim 45 is spun over to hold the edges in position.

Those skilled in the art will understand that many modifications may be made within the spirit and scope of my invention, and I desire that only such limitations shall be imposed as are indicated in the appended claims.

I claim as my invention:—

1. In an electrical heating apparatus, a flanged member having a hollow central hub constituting a liquid-receiving well, a second flanged member having a central aperture therein of a size to receive and closely fit around a portion of said hub, and a heater element clamped between the flanges of the said members, one of said members having an integral portion engaging the other member to secure said members together.

2. In an electrical heating apparatus, a flanged member having a central exteriorly screw-threaded hollow hub constituting a liquid-receiving well, a second flanged member having an interiorly screw-threaded aperture to receive and closely fit the screw-threaded portion of said hub, and a heater element between the flanges of the said members, the screw threads on said members coöperating to clamp said element and members together.

3. In an electrical heating apparatus, a member defining a liquid-receiving well and having an integral, outwardly-extending flange, a heating element supported on the said flange, an annular member surrounding the first-named member adjacent to the said well and having an outwardly-extending flange resting on the said heating element, and means for clamping the said heater element between the said flanges.

4. In an electrical heating apparatus, a member defining a liquid-receiving well and having an integral, outwardly-extending flange, a heating element supported on the said flange and an annular member surrounding the first-named member adjacent to the said well and having an outwardly-extending flange resting on the said heating element, the outer edge of one of the said flanges being bent over the adjacent edges of the other flange and of the said heater element.

5. In an electrical heating apparatus, a member defining a liquid-receiving well and having an integral, outwardly-extending flange, a heating element supported on the said flange and an annular member surrounding the first-named member adjacent to the said well and having an outwardly-extending flange resting on the said heating element, the outer edge of the said lower flange being bent over the adjacent edge of the upper flange and of the said heating element.

6. In an electrical heating apparatus, a member defining a liquid-receiving well and having an integral, outwardly-extending flange, a heating element supported on the said flange, an annular member surrounding the first-named member adjacent to the said well and having an outwardly-extending flange resting on the said heating element, means for clamping the said heating element between the said flanges, and a casing surrounding both of the said members and spaced therefrom.

In testimony whereof, I have hereunto subscribed my name this 25th day of March, 1913.

ORA A. COLBY.

Witnesses:
H. J. McHale,
B. B. Hines.